United States Patent
Kim et al.

(10) Patent No.: US 9,539,512 B1
(45) Date of Patent: Jan. 10, 2017

(54) FACILITATING PLAYER INTERACTIONS WITH TILES IN AN ONLINE GAME

(71) Applicant: KABAM, INC., San Francisco, CA (US)

(72) Inventors: John Kim, San Francisco, CA (US); David McNeill, San Francisco, CA (US); Albert Wei, San Francisco, CA (US); Wynne Chyou, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 30 days.

(21) Appl. No.: 14/320,500

(22) Filed: Jun. 30, 2014

(51) Int. Cl.
  *A63F 13/12* (2006.01)
  *A63F 13/52* (2014.01)
  *A63F 13/56* (2014.01)
  *A63F 13/847* (2014.01)
  *A63F 13/85* (2014.01)

(52) U.S. Cl.
  CPC ............... *A63F 13/52* (2014.09); *A63F 13/56* (2014.09); *A63F 13/847* (2014.09); *A63F 13/85* (2014.09)

(58) Field of Classification Search
  CPC ....................................................... A63F 9/24
  USPC ............................................................ 463/31
  See application file for complete search history.

(56) References Cited

U.S. PATENT DOCUMENTS

| | | | |
|---|---|---|---|
| 6,336,861 B1 | 1/2002 | Konoe et al. | 463/23 |
| 8,070,573 B2 | 12/2011 | Yuji et al. | 463/9 |
| 8,308,570 B2 | 11/2012 | Fiedler | 463/42 |
| 2012/0015748 A1 | 1/2012 | Osada | 463/43 |
| 2014/0323227 A1* | 10/2014 | Sano | A63F 13/79 463/42 |
| 2015/0038226 A1* | 2/2015 | Maeda | A63F 13/422 463/31 |

OTHER PUBLICATIONS

"Boom Beach Walkthrough" written by Talor Berthelson, published on or before Mar. 31, 2014, and printed from URL <http://www.gamezebo.com/2014/03/31/boom-beach-walkthrough-cheats-strategy-guide/>, 10 pages.*
"Boom Beach Wikipedia" printed from URL <https://en.wikipedia.org/wiki/Boom_Beach>, 3 pages.*
"Clash of Clans Wikipedia" printed from URL <https://en.wikipedia.org/wiki/Clash_of_Clans>, 5 pages.*

(Continued)

*Primary Examiner* — Jason Skaarup
(74) *Attorney, Agent, or Firm* — Sheppard Mullin Richter & Hampton LLP

(57) ABSTRACT

A system and method for facilitating player interaction with sets of virtual tiles in a game space are disclosed. A set of virtual tiles may be provided for player interaction such that a player may be enabled to engage the non-player entity (or entities) associated with the individual tiles in the set of virtual tiles using a set of resources granted to the player. The player may be enabled to allocate a subset of the granted resources to engage a given tile in the set. An outcome of the engagement may be determined stochastically or quasi-stochastically. The player may be enabled to interact with the next tile in the set upon defeating the non-player entity (or entities) associated with the previous tile. Upon the player defeating the non-player entity (or entities) associated with the last tile in the set, a prize may be awarded to the player.

18 Claims, 5 Drawing Sheets

(56) References Cited

OTHER PUBLICATIONS

"Clash of Clans Single Player Campaign" printed from URL <http://clashofclans.wikia.com/wiki/Single_Player_Campaign>, 25 pages.*
"Clash of Clans Raids" printed from URL <http://clashofclans.wikia.com/wiki/Raids>, 6 pages.*
Lopez, "Gameplay Design Fundamentals: Gameplay Progression", http://www.gamasutra.com/view/feature/130188/gameplay_design_fundamentals_.php?pri, printed on May 23, 2014, 8 pages.
Lock-and-Key Mechanisms, http://my.safaribooksonline.com/print?xmlid=9780132946728/ch11lev1sec11 of, printed on May 23, 2014, 8 pages.

* cited by examiner

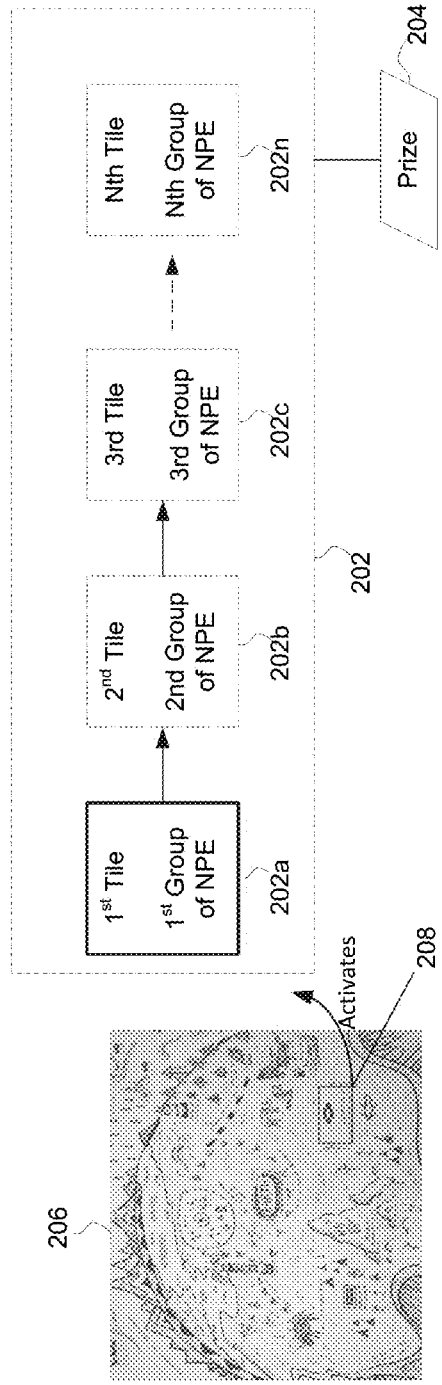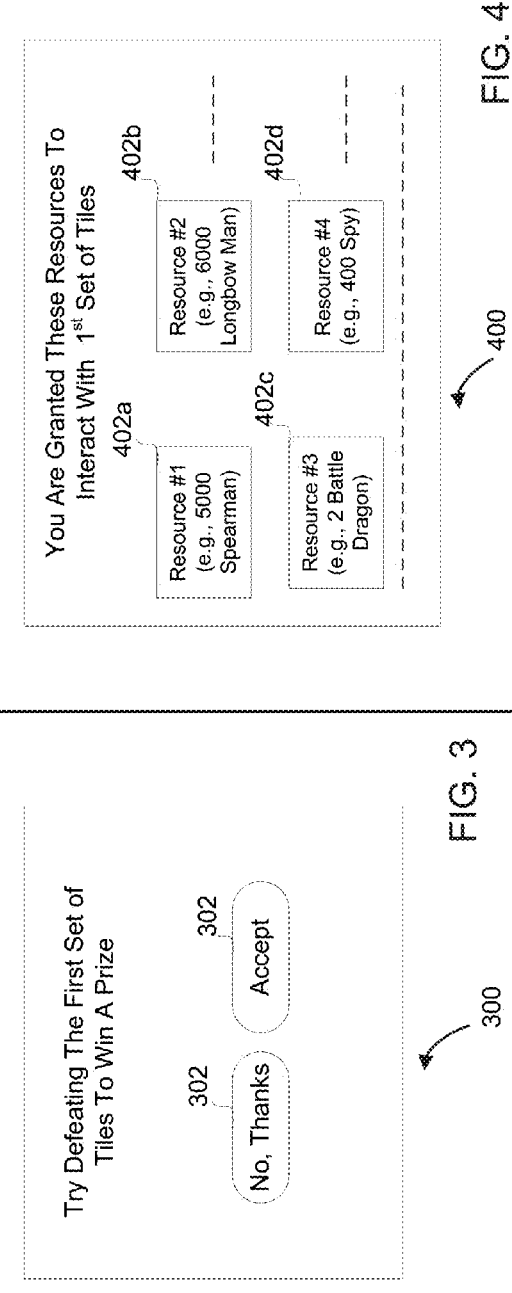
FIG. 2
FIG. 3
FIG. 4

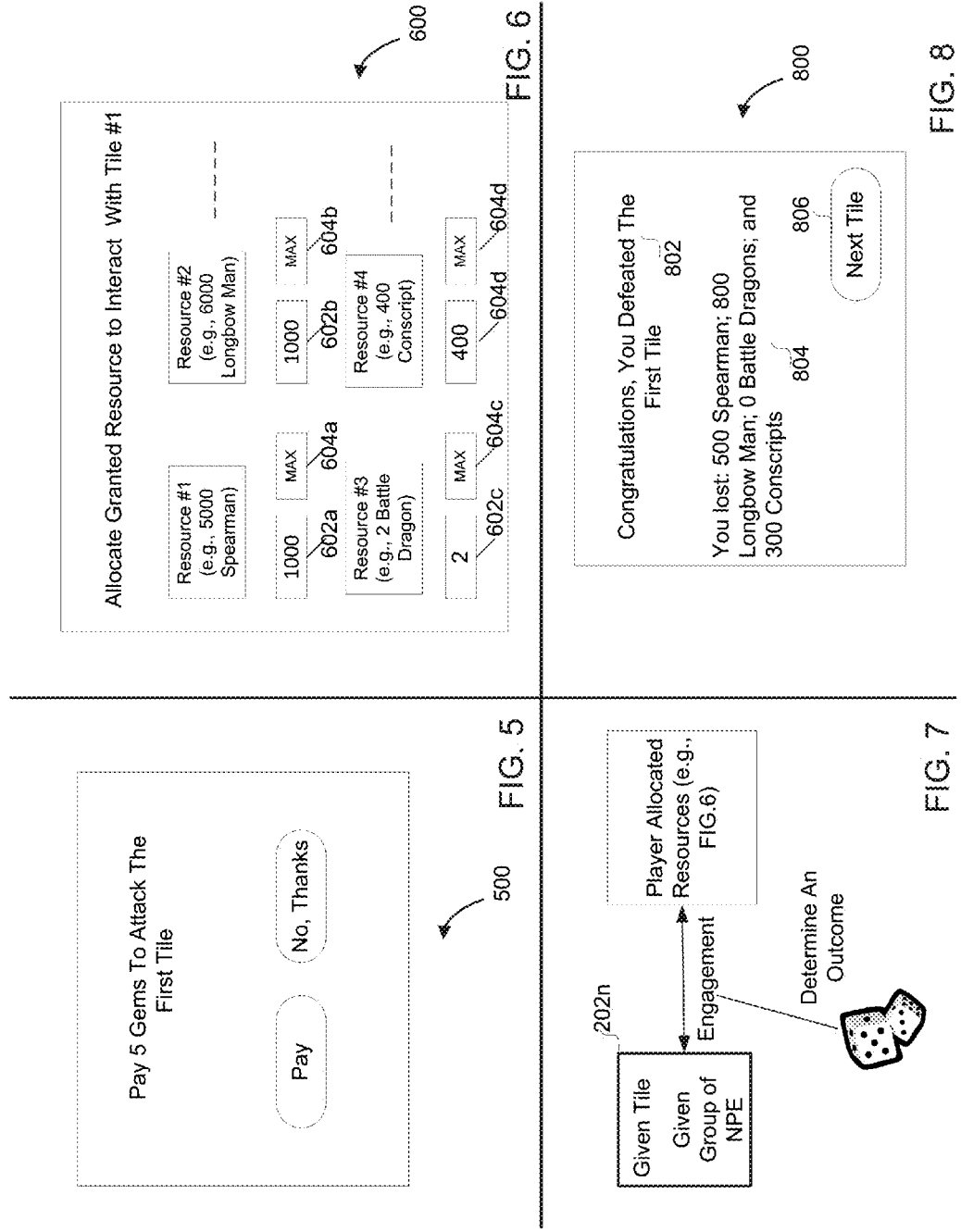

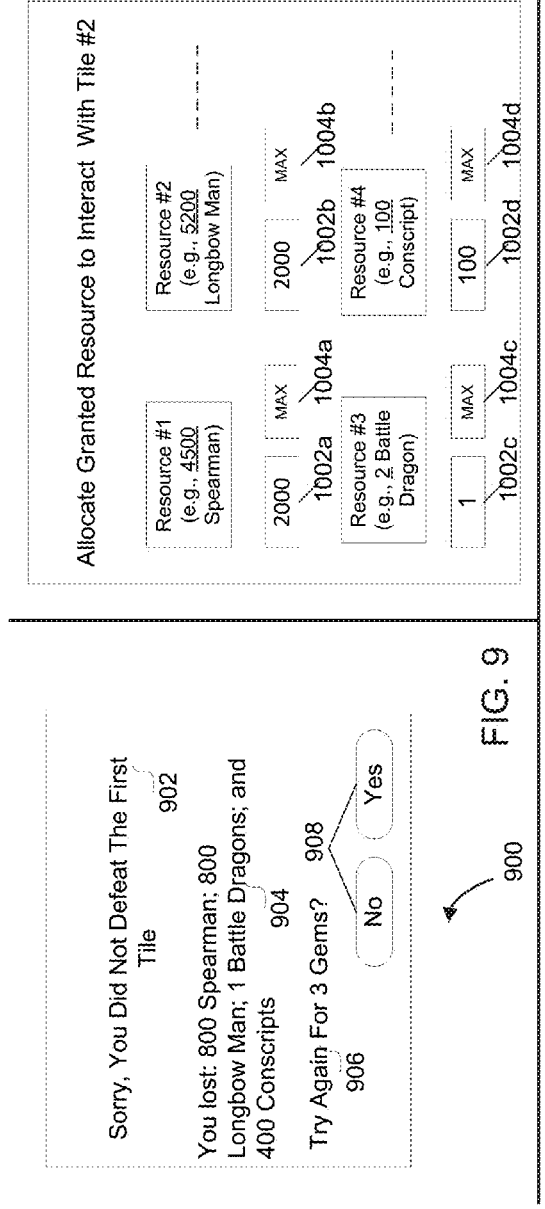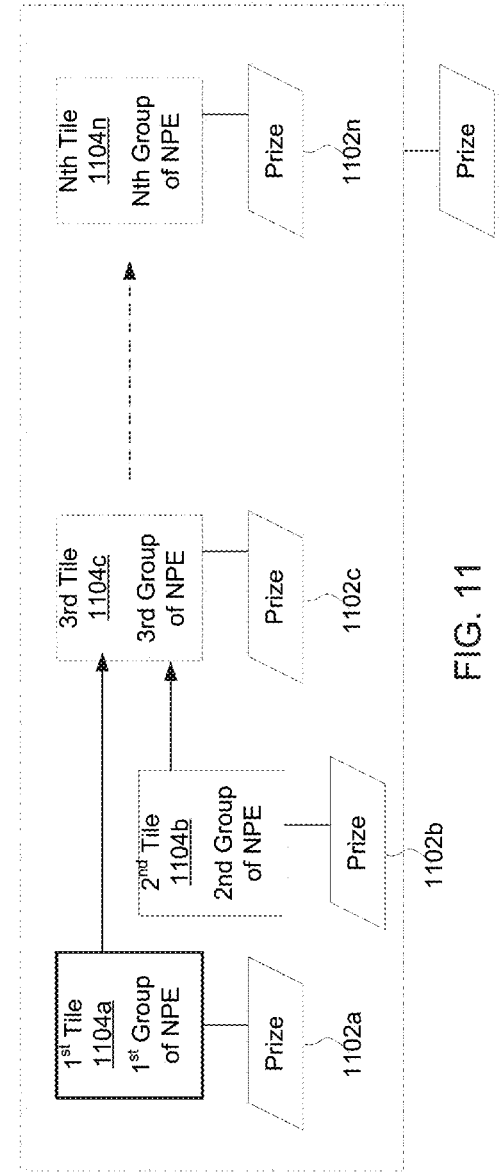

FACILITATING PLAYER INTERACTIONS WITH TILES IN AN ONLINE GAME

FIELD OF THE DISCLOSURE

This disclosure relates to facilitating player against environment interactions in an online game.

BACKGROUND

Facilitating player versus environment (PvE) combat in an online game is known. Conventional gaming system typically enables a player to control a player character in the online game to fight one or more non-player entities such as monster, boss, and other types of non-player entities in a PvE combat. In those systems, the PvE combat typically results in either the player character or the non-player entity being defeated.

Gating game content using non-player entities in an online game is known. A set of game content can be gated by one or more non-player entities such that access to the set of game content is granted upon the one or more non-player entities being defeated.

Game content key-and-lock mechanisms in an online game are generally known in the art. Such a mechanism typically requires a player to achieve a win status against a first set of game content (key) before a second set of game content (lock) may be made available for player access in the online game.

SUMMARY

One aspect of the disclosure relates to facilitating players to interact with a set of virtual tiles in an online game to win a prize associated with the set of virtual tiles. A player may be enabled to initiate a request to engage a set of tiles after pay an amount of stored consideration (e.g., virtual currency, points, real-world money credit and/or any other type(s) of stored consideration). After the request to engage the set of the tiles is received from the player, a set of resources may be granted to the player so that the player may use this set of resources to engage the set of tiles. A given tile in the set of tiles may be associated with a group of one or more non-player entities. The player may be enabled to allocate a subset of the granted resources to engage the non-player entities associated with the given tile in the set. Player interaction with the individual tiles in the set of tiles may be facilitated in a dependent fashion such that the player may be enabled to engage the non-player entity (or entities) associated with a second tile in the set only after the player has defeated the non-player entity (or entities) associated with a first tile in the set.

An outcome of the engagement between the subset of the resources allocated by the player and the non-player entities associated with the given tile may be determined stochastically or quasi-stochastically. This may involve evaluating combat actions between the two based on one or more combat characteristics of the allocated subset of the resources and/or one or more combat characteristics of the non-player entities associated with the given tile. Upon an evaluation that the player has defeated the non-player entities associated with the given tile, the player may be enabled to advance to the next tile in the set. The resources granted to the player may be adjusted to account for the losses of the resources incurred during the previous engagement(s). From the adjusted resources, the player may be enabled to allocate another subset of the resources to the engage the non-player entities associated with the next tile. Upon has the player has defeated the non-player entities associated with the last tile in the set, a prize associated with the set of tiles may be awarded to the player.

In some implementations, individual consideration may be associated with individual tiles in the set such that the player may be required to pay the individual consideration before engaging the non-player entity (or entities) associated with the individual tiles. In some implementations, individual prizes may be associated with the individual tiles such that players may be awarded the individual prizes after defeating the non-player entities associated with the individual tiles. This may enhance player experience in the game space. This may enhance monetization opportunities for the provider(s) of the online game as the players may be incentivized to pay to interact with the set of tiles to win the prize(s).

A system configured to facilitate accessing content across multiple online games may include one or more servers. The servers may operate in client/server architecture with one or more client computing platforms. The client computing platforms may be associated with the players of the game space. The servers may be configured to execute one or more of: a game component, a player component, a virtual tile set component, virtual tile interaction component, a resource allocation component, an award component, and/or any other components.

The game component may be configured to execute an instance of an online game. The instance of the online game executed by the game component may be associated with a game space in which gameplays may be facilitated for players of the online game. Within the game space, players may control one or more elements in the game space. The players may input commands with specific parameters to undertake specific deeds, maneuvers, actions, functions, spheres of actions and/or any other types of interactions within the game space. Within the game space of the online game, the typography may be divided into separate parts, units, squares, plots, grids, and/or any other type(s) of virtual tiles. Typically, through virtual tiles, the game space may be separated into distinguishable areas, facilitating evaluation game elements' positions and possibilities of actions. As such, the virtual tiles in the game space may be configured to define the game space: for example, to define the terrain of the game space, to define manner through which game elements may interact with each other, to define how fast game elements may move through the game space; and/or any other definitions. A given tile in the game space may be associated with a number of classifications, including height, terrain type, features, resources, and bordering and/or any other classifications.

Player component may be configured to access and/or manage one or more player accounts associated with the players of the online game. The individual player accounts may comprise player profiles and/or player information associated with players. The player information associated with a given player may comprise one or more player parameters related to the given player. The player information may include information related to purchases or spending by the given player in or for the game space.

The virtual tile set component may be configured to provide sets of virtual tiles for player interaction within the game space. The sets of virtual tiles provided by the virtual tile set component may include a first set of virtual tiles. In one example, the first set of virtual tiles may correspond to a virtual location in the game space. For instance, the player may be facilitated to initiate a request for interaction with the first set of virtual tiles at the virtual location in the game space. In one implementation, without limitation, the player is enabled to click on the virtual location to request interaction with the first set of virtual tiles corresponding to that location. Individual tiles in the first set of virtual tiles provided by the virtual tile set component may be associated with groups of non-player entities. Player interaction with the individual tiles in the first set of virtual tiles may include engagement (e.g., battle) with the groups of tiles associated with the individual tiles. In some examples, the engagement between the player and the group of non-player entities may result in one or more combative actions between the player and the group of non-player entities.

The individual tiles included in the first of tiles provided by virtual tile set component may be interconnected such that access to a second tile in the first set of virtual tiles may be made available to the player only after the player has defeated the non-player entities associated with the first tile. A prize may be associated with the first set of virtual tiles such that the prize may be awarded to the player after the player has defeated the non-player entity (or entities) associated with last tile in the first set of virtual tiles.

The virtual tile interaction component may be configured to facilitate the player to interact with the sets of virtual tiles provided by the virtual tile set component. Facilitating the player interaction with the sets of virtual tiles provided by the virtual tile set component by virtual tile interaction component may include facilitating the player interaction with the first of virtual tiles. Facilitating the player to interact with the first set of virtual tiles may include granting a set of resources to the player such that the player may user this set of resources to engage the non-player entities associated with the individual tiles in the first set of virtual tiles. In some implementations, the virtual tile interaction component may be configured such the player may only use the resources granted to the player to interact with the first set of virtual tiles. The resources granted to the player may vary as however desired by the provider, administrator, moderator, and/or any other entities related to the game space.

In some implementations, the virtual tile interaction component may be configured such that the player may be required to pay an amount consideration in exchange for interacting with the first set of virtual tiles. In implementations, a pay-gated scheme may be used in combination with the tile-gated scheme. For example, without limitation, access to the second tile in the first set of virtual tiles requires the player to defeat the one or more non-player entities associated with the first tile and to pay an amount of consideration.

The resource allocation component may be configured to enable the player to allocate subsets of the resources granted to the player for engaging non-player entities associated with individual tiles in the first set of virtual tiles. For a given tile in the first set, the resource allocation component may facilitate the player to allocate a subset of the resources granted to the player to engage the non-player entity (or entities) associated with the given tile in the first set of virtual tiles.

Returning to the virtual tile interaction component, upon player allocation of a subset of granted resources for engaging the one or more non-player entities associated with the given tile in the first set of virtual tiles, the virtual tile interaction component may simulate an engagement between the allocated subset of the resources granted to the player and the group of one or more non-player entities associated with the given tile. Simulating the engagement may involve simulating combat actions between the allocated resources and the one or more non-player entities, determining outcomes of the combat actions, evaluate for an outcome of the encounter based on the determined outcomes of the combat actions, and/or any other operations. The simulated combat actions may include exchanging hits, projectiles, magic spells, and/or any other combat actions between the allocated resources and the one or more non-player entities. An outcome of a simulated engagement between the allocated subset of resources and the one or more non-player entities may be determined based on one or more combat characteristics of the allocated subset of the granted resources and/or one or more combat characteristics of the non-player entities. The combat characteristics based on which the outcome of the individual combat action may be determined may include attributes related to strength, combat skill(s), combat ability and/or abilities, magic power (s), weapons, range, and/or any other attributes of the performing entity and/or the receiving entity. In some exemplary implementations, outcomes of the simulated engagement determined by the virtual tile interaction component may reflect factors of randomness. In some implementations, determining outcomes of the engagement by the virtual tile interaction component may be probabilistic such that the outcomes would not be the same if the same combat actions were evaluated again. Determining the outcome of the engagement by the virtual tile interaction component may include determining whether the allocated subset of granted resources has defeated the non-player entity (or entities) associated with the given tile. This may involve comparing the combat outcome actions between the allocated subset of resources and the non-player entity (or entities) to one or more predetermined threshold conditions.

Facilitating interaction with first set of virtual tiles may include adjusting resources granted to the player to account for resource losses during the engagement with non-player entity (or entities) associated with a given tile. In implementations, the resource allocation component may be configured to reduce the resources granted to the player for interacting with the first set of virtual tiles by the amount of losses incurred in an engagement. That is, the set of resources available to the player may be reduced due to engagements with non-player entity (or entities) associated with individual tiles as the player progress along the first set of virtual tiles.

The award component may be configured to award prizes to players for interacting with the sets of virtual tiles provided by the virtual tile set component. Awarding the prized by the award component includes award prizes to players for interacting with the first set of virtual tiles provided by the virtual tile set component. The prize may be awarded by the award component to the player after the player has defeated the non-player entity (or entities) associated with the last tile in the first set of virtual tiles using the resources granted to the player. In some implementations, the individual tiles in the first set of virtual tiles may be associated with individual prizes. The individual prizes may be awarded by the award component to the player after the player defeats the non-player entity (or entities) associated with individual tiles. In those implementations, the value or the amount of the individual prizes may increase as the player progress along the first set of virtual tiles.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates one exemplary configuration of a first set of virtual tiles that may be provided in the game space of the online game hosted by the system shown in FIG. 1.

FIG. 3 illustrates an example of facilitating a player to initiate a request to interact with the first set of virtual tiles in the game space shown in FIG. 2.

FIG. 4 illustrates one example of granting a set of resources to a player to enable the player to interact the first set of virtual tiles illustrated in FIG. 2.

FIG. 5 illustrates presenting an offer to the player to pay for interacting with the first set tiles.

FIG. 6 illustrates one example of facilitating the player to allocate resources granted to the player for attacking the first set of virtual tiles.

FIG. 7 illustrates one example of simulating an engagement between a subset of resources allocated by the player and the one or more non-player entity (or entities) associated with a given virtual tile.

FIG. 8 illustrates an example of an outcome determined for the encounter simulated in FIG. 7.

FIG. 9 illustrates another example of an outcome determined for the encounter simulated in FIG. 7.

FIG. 10 illustrates an example of resources available to the player for allocation to engage non-player entity (or entities) associated with a second tile after the player has defeated non-player entity (or entities) associated with the first tile as illustrated in FIG. 8.

FIG. 11 illustrates individual prizes may be associated with individual tiles in the first set of virtual tiles.

DETAILED DESCRIPTION

Figure 1:
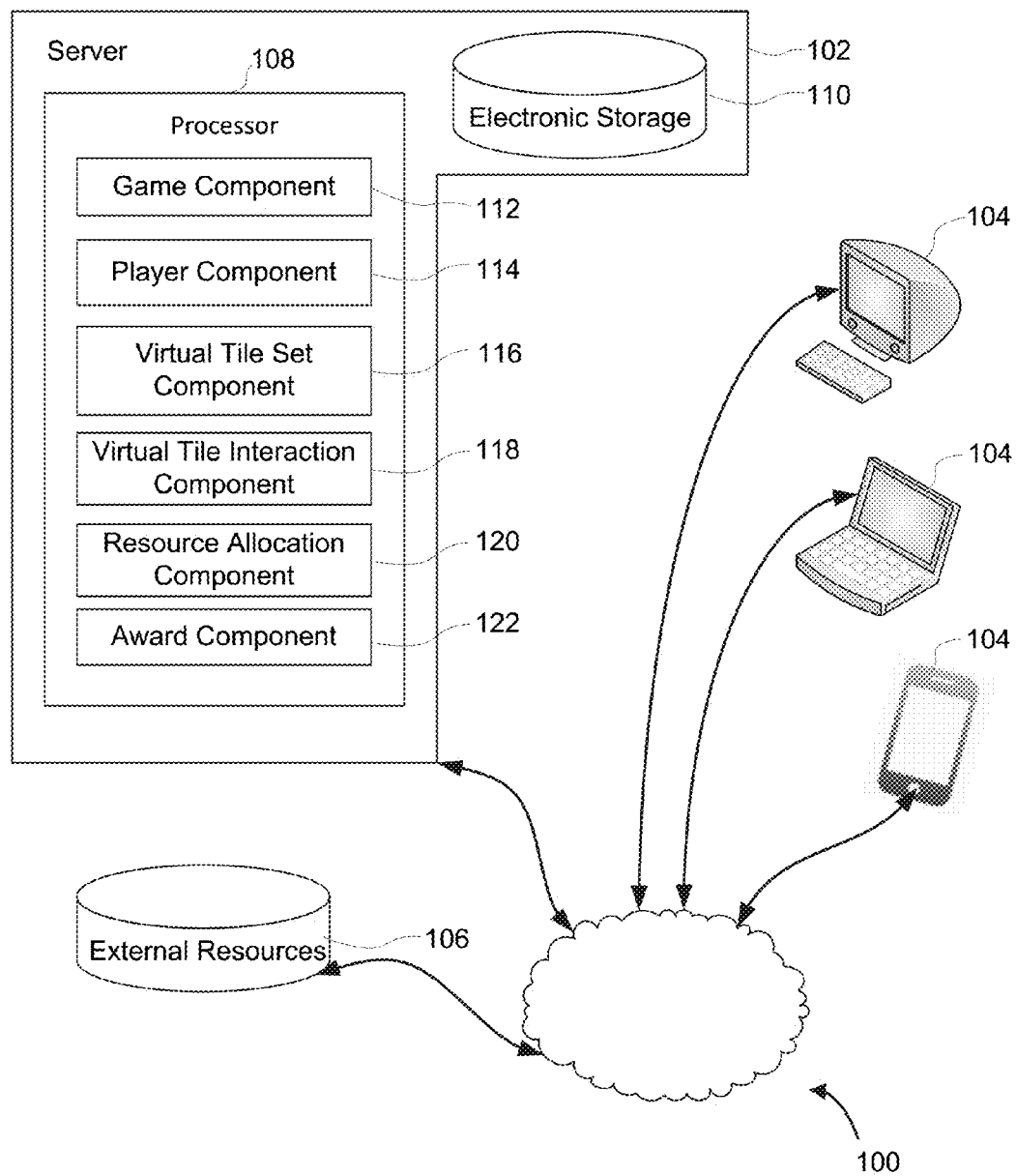
FIG. 1 illustrates a system configured to facilitate tile interaction in accordance with the disclosure.

FIG. 1 illustrates a system 100 to facilitate accessing content across multiple online games in accordance with the disclosure. Providing the online games may include hosting the online games over a network. In some implementations, as shown in this example, system 100 may include servers 102 configured for hosting online games. In this example, as shown, system 100 includes a server 102 configured for facilitating cross-game non-player entity retreating in accordance with the disclosure. The servers 102 may be configured to communicate with one or more client computing platforms 104 according to client/server architecture, and with each other. The players may access system 100 and/or the game spaces associated with the online games via client computing platforms 104. As shown, the servers 102 may comprise processors 108 configured to execute computer readable instructions to implement system components. The computer program components may include one or more of a game component 112, a player component 114, a virtual tile set component 116, a virtual tile interaction component 118, an resource allocation component 120, an award component 122 and/or any other components.

The game component 112 may be configured to execute an instance of a game space to provide an online game. Within the instance of game space, players may interact with elements of the online game and/or with each other through gameplays. The gameplays may include role-playing, vehicular maneuvering, first-person shooter, real-time strategy, turn-based strategy, simulation, music or rhythm playing, social interaction, twitching and/or any other gameplays. The execution of the game space of the online game by game component 112 may include determining a state associated with the online game. The state may be communicated (e.g., via streaming visual data, via object/position data, and/or other state information) from server 102 to client computing platforms 104 for presentation to players. The state determined and transmitted to a given client computing platform 104 may correspond to a view for a player character being controlled by a player via the given client computing platform 104. The state determined and transmitted to a given client computing platform 104 may correspond to a location in a game space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The online game may be persistent. That is, the online game may continue on whether or not individual players are currently logged in and/or participating in the online game. A player that logs out of the online game and then logs back in some time later may find the game space associated with the online game has been changed through the interactions of other players with the game space during the time the player was logged out. These changes may include changes to the game space, changes in the player's inventory, changes in other players' inventories, changes experienced by non-player entities, and/or other changes.

The game space of the online game, e.g., a game space that is accessible by players via clients (e.g., client computing platforms 104) may be simulated to present views of the game space to a player. The game space may have a topography, express ongoing real-time interaction by one or more players and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The game space of the online game may comprise game space characters that are automatically controlled in the game space of the online game. The automatically controlled game space characters may not be associated with any player within the online game. As such, the automatically controlled game space characters may be generated and/or developed by artificial intelligence configured with the server 102 by a provider, administrator, moderator, and/or any other characters related to the online game. These automatically controlled game space characters may evolve within the game space free from player controls and may interact with game space characters that are controlled by or associated with the players, other automatically controlled game space characters, and as well as the topography of the game space. Certain manifested traits may be associated with the automatically controlled game space characters in accordance with the artificial intelligence configured with the server 102. As used herein, such automatically controlled game space characters in the game space of the online game are referred to as "non-player entities".

The above description of the manner in which state of the game space associated with the online game as determined by game component 112 is not intended to be limiting. The game component 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the game space of the online game, the players may be enabled to control one or more elements in the game space associated with the online game. The player-controlled elements may include player-controlled characters, game space units (e.g., troops), objects (e.g., weapons, horses, vehicle and so on), simulated physical phenomena (e.g., wind, rain, earthquakes, and/or other phenomena), and/or other player-controlled elements. The player-controlled characters may include avatars that represent the players in the game space. The player controlled characters may include heroes, knights, commanders, leaders, generals and/or any other game space characters. The player-controlled characters may possess strength, skills, abilities, magic powers, knowledge, and/or any other individualized attributes. The game space units controlled by the player may include troops, cohorts, conscripts, bands, armies and/or any other game space entities that may be trained, recruited, captured, and/or otherwise acquired by player en mass. The objects controlled by the players may include weapons, mounts, vehicles, projectiles, magic items, wardrobes, boots, armor, knapsacks, medicine, healing potion, and/or any other virtual items that may be employed by the players for interaction within the online game.

In any case, the player-controlled elements may move through and interact with the game space (e.g., non-player entities, elements controlled by other players and/or topography in the game space) associated with the online game. The elements controlled by a given player may be created and/or customized by the given player. The given player may have an "inventory" of virtual goods and/or currency usable within the game space.

Interaction may be exercised through commands input by a given player through client computing platforms 104. The given player may interact with other players through communications exchanged within the game space. Such communications may include one or more of textual chat, instant messages, private messages, voice communications, and/or other communications. Communications may be received and entered by the players via their respective client computing platforms 104. Communications may be routed to and from the appropriate players through server 102 (e.g., through game component 112).

The given player may input commands with specific parameters to undertake specific deeds, actions, activities, functions, spheres of actions, activities, and/or any other types of interactions within the game space. For example, the given player may input commands to construct, upgrade and/or demolish virtual buildings; harvest and/or gather virtual resources; maneuver virtual player-controlled elements; train, heal, march, transport, reinforce, reassign, recruit, and/or arrange troops; attack, manage, create, demolish and/or defend cities, realms, kingdoms, and/or any other game space locations controlled by or associated with the players; craft or transport virtual items; interact with, compete against and cooperate with non-player entities and/or game space elements controlled by other players in combats; research technologies and/or skills; mine and/or prospect for virtual resources; complete missions, quests, and/or campaigns; exercise magic power and/or cast spells; and/or perform any other specific deeds, actions, functions, or sphere of actions, activities, and/or any other type(s) of interaction(s) within the game space. In some examples, the given player may input commands to compete against game space elements in an environment within the game space—i.e., Player vs. Environment (PvE) activities. In some examples, the given player may input commands to compete against each other within the game space—i.e., Player vs. Player (PvP) activities.

Executing the instance of the game space by the game component 112 may include executing player actions to facilitate player interactions with the game space and/or each other in response to receiving game space commands input by the players. Execution of the player action by the game component 112 may produce changes to the game state, which may reflect progresses and/or results of the player actions. In some examples, state changes caused by the execution of the player actions may be recorded in the electronic storage 110 to facilitate persistency throughout the game space of the online game. In some examples, execution of the player actions may not produce persistent changes to the game state (e.g., a player character jumping forward and backward successively may not produce any perceivable game state changes to other players).

Within the game space of the online game, resources may be provided to enable players to interact with the game space. Typically, resources provided in the game space of the instance of online game represent elements that may be used in the game space of the game space of the online game to fund or to be depleted by player actions, activities, and/or any other type(s) of player interaction(s) within the game space. Resources provided in the game space may be tangible such that they take on one or more physical forms. Tangible resources in the game space may require storage, transportation, and/or any other type(s) of handling. Common examples of tangible resources provided in the game space of the game space of the online game may include ammunition, virtual raw resources (e.g., lumber, stone, coal, gold, copper, oil, fish, rice, incense, wheat, crystals, and/or other virtual raw resources), equipment usable in the game space (e.g., weapons, armors, vehicles, and/or any other type(s) of equipment), and/or any other tangible resources.

By way of non-limiting example, within the instance of the game space, virtual raw resources may be provided as a form of tangible resources. A player may be enabled to acquire virtual raw resources, for example, through cultivating, mining, harvesting, purchasing, gifting, trading, prospecting, or any other actions in the game space. Virtual raw resources may be used to satisfy resource requirements in the game space. For example, the player may be facilitate use virtual resources stored in his/her inventory to construct building, craft items, fund various activities (e.g., researching, training, upgrading, and/or any other activities), and/or for any other purposes. Common examples of virtual raw resources provided in the game space may include food (e.g., rice, fish, wheat, etc.), minerals (e.g., wood, iron, ore, coal, oil, stone, crystal, etc.), plants, animals, and/or any other virtual raw resources. Transfer of resources between players may be reflected through player inventories such that the transferor player's inventory reduces an amount of the transferred resources that are added to the transferee player.

Resources provided in the game space the online game may be intangible such that they do not take on physical forms. Common examples of intangible resources provided in the game space may include virtual currencies, hit points, manna points, action points, health, strength, and/or any other type(s) of intangible resources. Players may be initially given such intangible resources in the game space, and may be facilitated to acquire them through interactions with the game space and/or with each other. For example, players may be given a number action points when they first join online game to fund their actions in the game space, and may be facilitated to "earn" action points through interactions with the game space and/or with other players.

By way of non-limiting example, virtual currencies may be provided in the game space as a form of intangible resources. Players may be enabled to collect, earn, purchase, be-gifted or otherwise acquire virtual currencies in the game space. For example, the players may purchase the virtual currencies with real-world money consideration (e.g., credit payment through credit card, electronic vouchers provided by the provider of the game space, physical tokens, and/or any other types of real-world currencies) through a virtual store. The players may earn the virtual currencies, for example through gameplays provided in the game space (e.g., PvP activities, PvE activities, in-game tournaments, tasks, quests, missions, and/or any other gameplays in the game space). For instance, a given player may earn a predetermined amount of virtual currencies after completing an in-game task in the game space. In some examples, the provider of the game space may simply make a certain amount of virtual currencies available, for instance through treasure troves in the game space such that the players may gratuitously collect the virtual currencies by exploring for the treasure troves. The players may acquire virtual currencies by receiving gifts that comprise virtual currencies from other players. One of ordinary skills in the art will appreciate that there are other ways for the players to acquire virtual currencies in the game space.

Within the game space of the online game, levels may be established to facilitate and/or incentivize player advancements. Players may receive virtual points for performing actions, participating in game space activities, interacting with game space elements and/or other players, and/or for engaging in any other interactions provided by the game space. A player may advance to a next level when a certain goal has been reached, an end condition has been fulfilled by the player in the online game, and/or the points acquired by the player have reached a threshold corresponding to the next level. Advancements in player levels typically result in attribute boosts, skill boosts, resistance boosts, higher status, and/or any other types of player progression in the game space. In some examples, for different categories of gameplays, skills, abilities, and/or any other player aspects, different levels may be established. For example, experience levels may be established in the online game to reflect overall experiences of the players, levels in certain skills may be established to reflect player progressions in acquiring or mastering these skills in the online game, and/or any other attribute levelling systems may be facilitated in the online game.

Within the game space of the online game, the typography may be divided into separate parts, units, squares, plots, grids, and/or any other type(s) of virtual tiles. For example, the game space may comprise land tiles, sea tiles, mountain tiles, and/or any other types of tiles. A player may be facilitated, e.g., through a "show tile" control in a gam interface for the online game, to reveal or toggle the tiles in the game. Typically, through virtual tiles, the game space may be separated into distinguishable areas, facilitating evaluation game elements' positions and possibilities of actions. As such, the virtual tiles in the game space may be configured to define the game space: for example, to define the terrain of the game space, to define manner through which game elements may interact with each other, to define how fast game elements may move through the game space; and/or any other definitions.

Individual tiles in the game space may correspond to virtual locations within the game space, such as, but not limited to, towns, cities, realms, kingdoms, castles, villages, metropolis, mines, forests, rivers, mountains, deserts, oceans, planets, stars, galaxies, enclaves, and/or any other type(s) of virtual locations. The individual tiles may be associated with a number of classifications, including height, terrain type, features, resources, and bordering and/or any other classifications. By way of non-limiting example, a set of resources, such as gold, mines, weapons for pickup, and/or any other type(s) of resources usable in the online game, may be associated with a tile such that the player may access (e.g., acquire) this set of resources through interaction with the tile (e.g., send a character controlled by the player to the tile).

Some of the virtual tiles in the game space may be associated with one or more non-player entities such that passing through these virtual tiles access the resources associated with the tiles may trigger the non-player entities and results in an engagement (e.g., a battle) with the non-player entities. A commonly known example is that a virtual tile may be guarded by a monster boss in the game space such that in order to pass through or access the resource associated with the virtual tile, the player must defeat the monster boss between.

Player component 114 may be configured to access and/or manage one or more player accounts associated with the players of the online game. The individual player accounts may comprise player profiles and/or player information associated with players. The one or more player profiles and/or player information may include information stored by server 102, one or more of the client computing platforms 104, and/or other storage locations. The player information associated with a given player may comprise one or more player parameters related to the given player. The one or more player parameters may include, but not limited to, a language spoken by, a geolocation of, an age group of, a time zone of, a level of experience related to the game space by, a level of activity level by the given player, and/or any other player parameters associated with the given player. The level of experience of the given player may include and/or indicate a rank of the player in the game space, cumulative experience points (XP) acquired by the given player in the game space, a skill level of the given player in the game space, a level of progression of the given player in the game space, or any other progressive aspects indicating a status of the given player in the game space.

The player information may include information related to purchases or spending by the given player in or for the game space. Such spending information may include, for example, purchase information for individual transactions, a spend rate, a total spend amount, and/or other information related to player purchases. The spending information associated with a given player may indicate a level of spending by the given player within the game space, for example, without limitation, lifetime spending (total spending by the given player in the game space), average spending during certain predetermined periods (e.g., spending by the given player during thanksgiving, Christmas and/or any other periods), spending by the given player during certain events within the game space (e.g., spending by the given player during a specific tournament, quest, contest, and/or any other types of game space events), and any other spending information by the given player.

The player profiles may include, for example, information identifying players (e.g., a player name or handle, a number, an identifier, and/or other identifying information) within the game space, security login information (e.g., a login code or password), game space account information, subscription information, virtual currency account information (e.g., related to currency held in credit for a player), relationship information (e.g., information related to relationships between players in the game space), game space usage information, demographic information associated with players, interaction history among players in the game space, information stated by players, purchase information of players, browsing history of players, a client computing platform identification associated with a player, a phone number associated with a player, and/or other information related to players. The player information managed by the player component 114 may include information indicating levels of interaction with the game space by individual players. The interaction level of an individual player as indicated in such information may reflect an amount of interaction with the game space by the individual player.

The virtual tile set component 116 may be configured to provide sets of virtual tiles for player interaction within the game space. The sets of virtual tiles provided by the virtual tile set component 116 may include a first set of virtual tiles. In some implementations, the first set of virtual tiles may include two or more virtual tiles. In one example, the first set of virtual tiles may correspond to a virtual location in the game space. In that example, interaction with the first set of virtual tiles may be triggered for a player upon the player initiates an action at the virtual location that triggers the first set of virtual tiles. For instance, the player may be facilitated to initiate a request for interaction with the first set of virtual tiles at the virtual location in the game space. In one implementation, without limitation, the player is enabled to click on the virtual location to request interaction with the first set of virtual tiles corresponding to that location. Individual tiles in the first set of virtual tiles provided by the virtual tile set component 116 may be associated with groups of non-player entities. Player interaction with the individual tiles in the first set of virtual tiles may include engagement (e.g., battle) with the groups of tiles associated with the individual tiles. For example, a given tile in the first set of virtual tiles may be guarded by a corresponding group of one or more non-player entities. In that example, interacting with the given tile by the player may trigger an engagement with the group of non-player entities guarding the given tile. The group of non-player entities associated with the given tile may include monsters, magic creatures, bandits, troops, pets, and/or any other type(s) of non-player entities. For example, without limitation, accessing the given tile by the player may trigger engagement with a group of monsters guarding the tile. In some examples, the engagement between the player and the group of non-player entities may result in one or more combative actions between the player and the group of non-player entities.

The individual tiles included in the first of tiles provided by virtual tile set component 116 may be interconnected such that access to a second tile in the first set of virtual tiles may be made available to the player only after the player has defeated the non-player entities associated with the first tile. Accordingly, some of the tiles in the first set of virtual tiles may not be available for player access initially; and these tiles may only be available for player access after the player has defeated non-player entities associated with other tiles. A prize may be associated with the first set of virtual tiles such that the prize may be awarded to the player after the player has defeated the non-player entity (or entities) associated with last tile in the first set of virtual tiles. The prize may include any form of objects, for example, such as virtual points, virtual currencies, virtual items usable in the game space, real-world money credit, and/or any other type(s) of prize(s).

By way of non-limiting example, FIG. 2 illustrates one exemplary configuration of a first set of virtual tiles that may be provided in the game space of the online game hosted by the system shown in FIG. 1. It will be described with reference to FIG. 1. As shown, a game space 206 representing a virtual world of the online game may be implemented on a client computing platform 104. As shown, the game space 206 may comprise virtual locations for interaction by the player, for example such as the virtual location 208 illustrated in this example. As illustrated, the virtual location 208 may be activated by the player (e.g., by clicking on the virtual location or sending a player character to the virtual location). A shown, interaction with the virtual tile 208 by the player may include enabling the player to interact with a set of tiles 202 associated with the virtual tile 208. By way of non-limiting example, the virtual tile 208 may correspond to an area in the game space 206, and the first set of virtual tiles 202 may correspond to some or all of constituent parts of that area.

As can be seen from FIG. 2, the first set of virtual tiles 202 may include a number of individual tiles, such as tiles 202*a*, 202*b*, 202*c*, and 202*n*. As illustrated, the individual tiles 202 may be associated a group of one or more non-player entities. As illustrated in this example, without limitation, the individual tiles 202 may be interconnected such that they may be accessed in succession. As also illustrated, the individual tiles 202 may be associated with corresponding groups of non-player entities such that the player must defeat the group of non-player entities associated with a given tile 202. In this example, the first tile 202*a* is initially available for access by the player upon the request to interact with the set of virtual tiles 202 from the player (e.g., via the tile 208) is received. As illustrated in this example, tile 202*b* may not be available for access by the player initially until the player has defeated the first group of non-player entity (or entities) associated with the first tile 202*a*; tile 202*b* may not be available for access by the player initially until the player has defeated the second group of non-player entity (or entities) associated with the first tile 202*b* and so on. As illustrated, a prize 204 may be associated with the first set of virtual tiles 202 such that the player may be awarded the prize 204 after defeating the non-player entity (or entities) associated with the last tile, e.g., 202*n*, in the first set of virtual tiles 202.

It should be understood the example described in FIG. 2 is merely illustrative. The configuration of the set of tiles 202 for player interaction in accordance with the disclosure may not necessarily be limited to a simple linear configuration as illustrated in FIG. 2. For example, in one implementation, a number of tiles in the first set 200 may be initially available for the player to access and more tiles in the first set 200 may be available for access after the player has defeater non-player entity (or entities) associated with some or all of the initially available tiles in the first set of virtual tiles 202. In that example, the configuration of the first set of virtual tiles 202 may form a tree like configuration.

FIG. 3 illustrates an example of facilitating a player to initiate a request to interact with the first set of virtual tiles in the game space shown in FIG. 2. As can be seen from FIG. 3, an interface 300 may be provided by a system such as the system 100 described herein. The interface 300 may be presented on a client computing platform 104 associated with a player upon the player initiates an action in the game space that triggers the presentation of the interface 300. Such a trigger action may include entering a virtual location, such as the virtual location 208 shown in FIG. 2, interacting with a virtual object at the virtual location, interacting with a character (non-player entity or player character controlled by another player) at the virtual location, completing a task at the virtual location, and/or any other trigger actions. As illustrated in FIG. 3, the interface 300 may be presented to the player informing the player that the player may defeat the first set of virtual tiles to win a prize. As also illustrated, field controls such as buttons 302 may be provided in the interface 300 to enable the player to initiate or refuse the request to interact with the first set of virtual tiles.

The virtual tile interaction component 118 may be configured to facilitate the player to interact with the sets of virtual tiles provided by the virtual tile set component 116. To facilitate player interaction with the sets of virtual tiles, the virtual tile interaction component 118 may receive activation request to activate the sets of virtual tiles from a player. Facilitating the player interaction with the sets of virtual tiles provided by the virtual tile set component 116 may include facilitating the player interaction with the first of virtual tiles. As illustrated in FIG. 3, this may be facilitated by providing an interface 300 to facilitate the player to request interaction with the first set of virtual tiles. Facilitating the player to interact with the first set of virtual tiles may include granting a set of resources to the player such that the player may user this set of resources to engage the non-player entities associated with the individual tiles in the first set of virtual tiles. That is, during the player engagement with the first set of virtual tiles in the game space, the resources may be granted to the user to enable the player to interact with the first set of virtual tiles with the granted resources. In some implementations, the virtual tile interaction component 118 may be configured such the player may only use the resources granted to the player to interact with the first set of virtual tiles. For instance, the resources granted to the player by the virtual tile interaction component 118 may only be used by the player during the player's engagement with the non-player entities associated with the individual tiles in the first set of virtual tiles and may not be available to the player (e.g., via player inventory) when the player does not interact with the non-player entities associated with the individual tiles in the first set of virtual tiles.

The resources granted to the player may vary as however desired by the provider, administrator, moderator, and/or any other entities related to the game space. By way of non-limiting example, the resources that may be granted to the player may include a quantity of troops of any kind (e.g., foot soldiers, spearman, longbow man, infantry, marine, special force, navy, cavalries, magic creatures, mages, or any other type(s) of troops), a quantity of heroes (e.g., generals, knights, dragon riders, and/or any other types of heroes), a quantity of weapons, a quantity of healing potions, a quantity of ammunitions, a quantity of action points, and/or any other type(s) of resources usable in the game space.

FIG. 4 illustrates one example of granting a set of resources to a player to enable the player to interact the first set of virtual tiles illustrated in FIG. 2. It will be described with reference to FIGS. 1-3. As shown, an interface 400 may be presented on a client computing platform 104 associated with the player to inform the player that a set of resources 402 may be granted to the player after the player has requested to interact with the first set of virtual tiles 202 as illustrated in FIG. 3. As illustrated, individual display widgets 402, such as widgets 402*a*, 402*b*, 402*c*, 402*d* shown in this example, may be presented in the interface 400 to inform the player that various resources are granted to the player for interacting with the first set of virtual tiles 202. In some implementations, the player may only use the granted resources as shown to attack the first set of virtual tiles 202.

Returning to FIG. 1, in some implementations, the virtual tile interaction component 118 may be configured such that the player may be required to pay an amount consideration in exchange for interacting with the first set of virtual tiles. For example, FIG. 5 illustrates presenting an offer to the player to pay for interacting with the first set tiles. It will be described with reference to FIGS. 1-2. As can be seen from FIG. 5, an offer 500 may be presented to the player on the client computing platform 104 associated with the player. As illustrated, the offer 500 may inform the player that the player is required to pay an amount of consideration, such as an amount of gems (virtual currencies) as shown in this example, in order to interact with the first set of virtual tiles 202 shown in FIG. 2. For instance, in one implementation, offer 500 may be presented to the player on the client computing platform 104, upon the player click "Accept" in FIG. 3. In some implementations, individual tiles in the first set of virtual tiles may be associated with an individual amount of consideration (e.g., a tile price). For example, without limitation, a first amount of consideration may be associated with the first tile 202*a* such that the player must pay that amount of consideration in exchange for interacting with the first tile, a second amount of consideration may be associated with the second tile 202*b* such that the player must pay that amount of consideration in exchange for interacting with the second tile, and so on. In those implementations, the amount of consideration associated with the individual tiles may be progressive such that they increase as the player progress along the tiles. As an illustration, without limitation, the player may be required to pay 1 gem to interact with the first tile, to pay 3 gems to interact with the second tile, to pay 5 gems to interact the third tile, to pay 7 gems to interact with the fourth tile, and so on. The progressive pay for the tiles in the first set of virtual tiles may be perceived as diminishing cost (as compared to the real price) as the player is getting closer to defeating the last tile in the first set of virtual tiles 202 to win the prize 204. In implementations, such a pay-gated scheme may be used in combination with the tile-gated scheme. For example, without limitation, access to the second tile in the first set of virtual tiles requires the player to defeat the non-player entities associated with the first tile and to pay an amount of consideration.

Returning to FIG. 1, as mentioned above, for facilitating the player to interact with the first set of virtual tiles, a set of resources may be granted to the player. The resource allocation component 120 may be configured to enable the player to allocate subsets of the resources granted to the player for engaging non-player entities associated with individual tiles in the first set of virtual tiles. For a given tile in the first set, the resource allocation component 120 may facilitate the player to allocate a subset of the resources granted to the player as illustrated in FIG. 4 to engage the non-player entity (or entities) associated with the given tile in the first set of virtual tiles.

FIG. 6 illustrates one example of facilitating the player to allocate resources granted to the player for interacting with the first set of virtual tiles. It will be described with reference FIG. 2. As illustrated, an interface 600 may be presented to the player on the client computing platform 104 associated with the player to enable the player to allocate a subset of the granted resources (shown in FIG. 4) to engage non-player entity (or entities) associated with a given individual tile, e.g., the first tile, in the first set of virtual tiles. As shown, input receipt boxes 602 may be provided in the interface 600 to receive inputs from the player. The received inputs may indicate a quantity of a kind of granted resources the player would like to allocate to engage the non-player entity or entities associated with the given tile. As illustrated in this example, the player allocates 1000 out of 5000 resource #1 (e.g., spearman), 1000 out of 6000 resource #2 (e.g., longbow man), 2 out of 2 resource #3 (e.g., battle dragons), 400 out of 400 resource #4 (e.g., conscripts) and any other granted resources to engage the non-player entity or entities associated with the first tile 202a. The allocated resources as illustrated in FIG. 6 may represent one example of a subset of the resources granted to the player to engage the non-player entity (or entities) associated with the given tile in the first set of tiles. As also shown, field controls 604 may also be provided in the interface 600 to enable the player to allocate all of the granted resource of a specific kind to engage the non-player entity or entities associated with the first tile.

Returning to FIG. 1, upon player allocation of a subset of granted resources to engage the one or more non-player entities associated with the given tile in the first set of virtual tiles, the virtual tile interaction component 118 may simulate the engagement between the allocated subset of resources and the group of one or more non-player entities associated with the given tile. Simulating the engagement may involve simulating combat actions between the allocated resources and the one or more non-player entities, determining outcomes of the combat actions, evaluate for an outcome of the encounter based on the determined outcomes of the combat actions, and/or any other operations. The simulated combat actions may include exchanging hits, projectiles, magic spells, and/or any other combat actions between the allocated resources and the one or more non-player entities. An outcome of a simulated engagement between the allocated subset of resources and the one or more non-player entities may be determined based on one or more combat characteristics of the allocated subset of the granted resources and/or one or more combat characteristics of the non-player entities. The combat characteristics based on which the outcome of the individual combat action may be determined may include attributes related to strength, combat skill(s), combat ability and/or abilities, magic power(s), weapons, range, and/or any other attributes of the performing entity and/or the receiving entity. In some exemplary implementations, for determining an outcome of an individual combat action, pertinent combat characteristics of the performing entity and/or the receiving entity may be evaluated by the using a combat evaluation function or functions.

In some exemplary implementations, outcomes of the simulated engagement determined by the virtual tile interaction component 118 may reflect factors of randomness. For example, the virtual tile interaction component 118 may randomly determine a combat action by a performing entity may miss the receiving entity completely in some instances; and may hit the receiving entity but inflict fewer damages to the receiving entity than those being capable of by the performing entity in some other instances. In some implementations, determining outcomes of the engagement by the virtual tile interaction component 118 may be probabilistic such that the outcomes would not be the same if the same combat actions were evaluated again. Typical outcomes of a given engagement may include elimination of some or all of the allocated resources and/or non-player entities, damages (e.g., health, strength, body integrity, mana, magic power, and/or any other attribute reduction) to some or all of the allocated resources and/or non-player entities, character progression (e.g., level up of a particular allocated resource—for instance a selected general), morale reduction, movement reduction, and/or any other type(s) of outcome(s).

Determining the outcome of the engagement by the virtual tile interaction component 118 may include determining whether the allocated subset of granted resources has defeated the non-player entity (or entities) associated with the given tile. This may involve comparing the combat outcome actions between the allocated subset of resources and the non-player entity (or entities) to one or more predetermined threshold conditions. The threshold conditions may be configured by the provider, administrator, moderator, and/or any other entities related to the game space at a configuration stage of the system 100 and/or at a runtime stage of the system 100. Some examples of such a predetermined threshold condition for defeating the non-player entity or entities associated with the given tile may include eliminating all of the non-player entity(s) guarding the given tile, reducing the number of non-player entity(s) to a threshold number, reducing the health of the non-player entity(s) to a threshold health level, reducing morale of the non-player entity(s) to a threshold morale level, eliminate one or more significant non-player entities guarding the given tile (e.g., eliminate the general leading the infantry stationed at the given tile), and/or any other threshold conditions.

FIG. 7 illustrates one example of simulating an engagement between a subset of resources allocated by the player and the one or more non-player entity (or entities) associated with a given virtual tile. As shown, simulating the engagement may include determining an outcome of the engagement. As illustrated, the outcome determination may be probabilistic or quasi-probabilistic such that the determined outcome may appear to be random as describe above.

FIG. 8 illustrates an example of presenting an outcome determined for the engagement simulated in FIG. 7. As shown, a message 800 may be presented to the player on the client computing platform 104. The message 800 may inform the player of an outcome determined for the engagement between the allocated subset of resources and the non-player entity (or entities) associated with the given tile in the first set of virtual tile. As illustrated, the determined outcome of the engagement may include a status 802 indicating whether the allocated subset of resources has defeated the non-player entity (or entities) associated with the given tile, an engagement report 804 reporting damages incurred to the resources granted to the player during the engagement, and/or any other information (not shown in this example). In this example, the status 902 indicates that the player has defeated the one or more non-player entities associated with the given tile. As illustrated, a number of allocated resources may be lost during the engagement. The granted resources available to the player to engage the remaining tiles in the first set of virtual tiles will be adjusted to account for this loss. As also shown, a button 806 may also be presented in the message 800 to enable the player to move onto the next title to engage the non-player entity (or entities) therewith.

FIG. 9 illustrates another example of an outcome evaluated for the encounter simulated in FIG. 7. As shown in this example, the status 902 indicates that the player did not defeat the one or more non-player entities associated with the given tile in the first set of virtual tiles, and the engagement report 904 may be presented to report specific engagement outcome to the player. As illustrated, an offer 906 may be presented to the player such that the player may accept the offer 906 to try again to re-engage the one or more non-player entities associated with the given tile in exchange for an amount of consideration from the player (e.g., 3 gems in this example). As shown, buttons 908 may be provided to enable the player to accept or deny such an offer.

Returning to FIG. 1, facilitating interaction with first set of virtual tiles may include adjusting resources granted to the player to account for resource losses during the engagement with non-player entity (or entities) associated with a given tile. In implementations, the resource allocation component 120 may be configured to reduce the resources granted to the player for interacting with the first set of virtual tiles by the amount of losses incurred in an engagement. That is, the set of resources available to the player may be reduced due to engagements with non-player entity (or entities) associated with individual tiles as the player progress along the first set of virtual tiles. FIG. 10 illustrates an example of resources available to the player for allocation to engage non-player entity (or entities) associated with a second tile after the player has defeated non-player entity (or entities) associated with the first tile as illustrated in FIG. 8. It will be described with reference to FIG. 4 and FIG. 8. As shown, resources available for the user to interact with the second tile may be reduced as compared to the resources originally allocated to the player illustrated in FIG. 4. This reflects the engagement outcome determined for the first engagement (e.g., as illustrated in FIG. 8). The player may be enabled to allocate a second subset of the resources (reduced) to interact with the second tile similarly to that illustrated in FIG. 4. Upon the allocation of the second subset of the resources, engagement between the non-player entity (or entities) associated with the second tile and the allocated second subset of the resources may be simulated by the virtual tile interaction component 118 and the outcome of the engagement may be determined in similar fashion to that shown in FIG. 7 and described herein. This process may repeat until the player has defeated the non-player entity (or entities) associated with the last tile in the first set of virtual tiles.

The award component 122 may be configured to award prizes to players for interacting with the sets of virtual tiles provided by the virtual tile set component 116. Awarding the prized by the award component 122 includes award prizes to players for interacting with the first set of virtual tiles provided by the virtual tile set component 116. As illustrated in FIG. 2, the first set of virtual tile may be associated with a prize 204 such that the prize 204 may be awarded by the award component 122 to the player after the player has defeated the non-player entity (or entities) associated with the last tile in the first set of virtual tiles using the resources granted to the player. The prize 204 may include an amount of virtual currencies, a quantity of virtual items usable in the game space, an amount of real-world money credit, a number of points that may be used towards player progression in the game space (e.g., to increase player level in the game space), and/or any other type(s) of prizes.

In some implementations, the individual tiles, such as tiles 202a, 202b, 202c, 202n, in the first set of virtual tiles may be associated with individual prizes. The individual prizes may be awarded by the award component 122 to the player after the player defeats the individual tiles 202a, 202b, 202c, 202n. FIG. 11 illustrates individual prizes may be associated with individual tiles in the first set of virtual tiles. In this example, as shown, tiles 1104a and 1104b may be initially available for the player to interact with upon the player requests to interact with the set of virtual tiles 1104. As shown, the individual tiles 1104 may be associated with individual prizes that may be awarded to the player after the player has defeated non-player entity (or entities) associated with the individual tiles using the resources granted to the player. In some implementations, the value or the amount of the prizes 1102 may increase as the player progress along the tiles 1104. For example, the value of prizes 1102a and 1102b (e.g., 5 gems each) may be less than the value of the prize 1102c (e.g., 10 gems). Such ever increasing prize scheme may be presented to the player prior to the player interaction with the first set of virtual tiles. This may incentivize the player to continue to interact with the first set of virtual tiles in order to acquire more valuable prizes associated with "later" tiles in the first set of virtual tiles.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or player associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122. Processor 108 may be configured to execute components 112, 114, 116, 118, 120, 122 by software; hardware; firmware; some combination of software, hardware, and/or firmware; and/or other mechanisms for configuring processing capabilities on processor 108.

It should be appreciated that although components 112, 114, 116, 118, 120, 122 are illustrated in FIG. 1 as being co-located within a single processing unit, in implementations in which processor 108 includes multiple processing units, one or more of components 112, 114, 116, 118, 120, 122 may be located remotely from the other components. The description of the functionality provided by the different components 112, 114, 116, 118, 120, 122 described below is for illustrative purposes, and is not intended to be limiting, as any of components 112, 114, 116, 118, 120, 122 may provide more or less functionality than is described. For example, one or more of components 112, 114, 116, 118, 120, 122 may be eliminated, and some or all of its functionality may be provided by other ones of components 112, 114, 116, 118, 120, 122. As another example, processor 108 may be configured to execute one or more additional components that may perform some or all of the functionality attributed below to one of components 112, 114, 116, 118, 120, 122.

Figure 12:
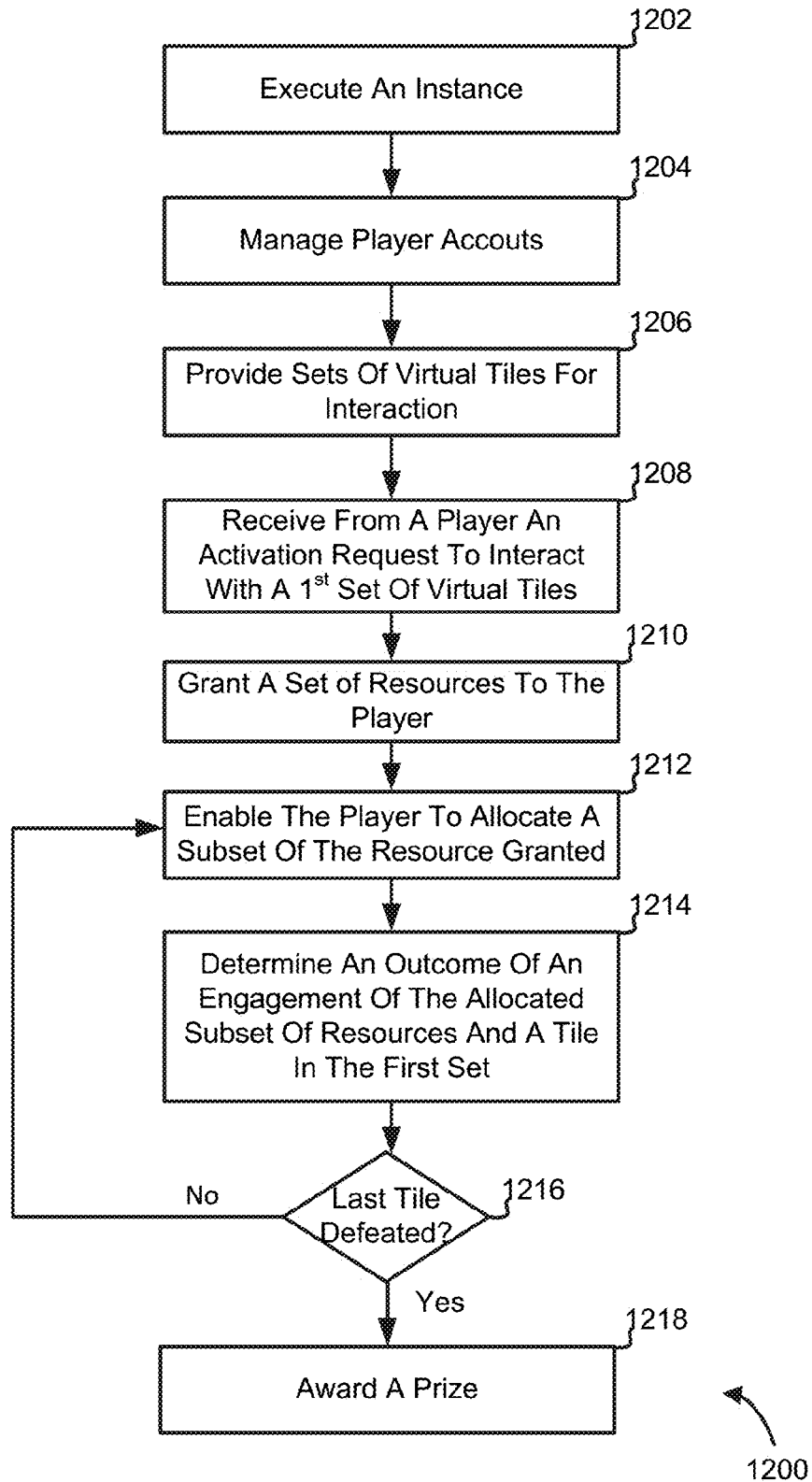
FIG. 12 illustrates one exemplary method for in accordance with the disclosure.

FIG. 12 illustrates one exemplary method 1200 for facilitating player interaction with virtual tiles in a game space in accordance with the disclosure. The operations of method 1200 presented below are intended to be illustrative. In some embodiments, method 1200 may be accomplished with one or more additional operations not described, and/or without one or more of the operations discussed. Additionally, the order in which the operations of method 1200 illustrated in FIG. 12 and described below is not intended to be limiting.

In some embodiments, method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

At an operation 1202, an instance of an online game may be executed. The instance of the online game executed in operation 1202 may be associated with a game space in which gameplays may be facilitated for players of the online game. Within the game space, players may control one or more elements in the game space. The players may input commands with specific parameters to undertake specific deeds, maneuvers, actions, functions, spheres of actions and/or any other types of interactions within the game space. Within the game space of the online game, the typography may be divided into separate parts, units, squares, plots, grids, and/or any other type(s) of virtual tiles. Typically, through virtual tiles, the game space may be separated into distinguishable areas, facilitating evaluation game elements' positions and possibilities of actions. As such, the virtual tiles in the game space may be configured to define the game space: for example, to define the terrain of the game space, to define manner through which game elements may interact with each other, to define how fast game elements may move through the game space; and/or any other definitions. A given tile in the game space may be associated with a number of classifications, including height, terrain type, features, resources, and bordering and/or any other classifications. In some implementations, operation 1202 may be performed by a game component the same as or similar to game component 112 (shown in FIG. 1 and described herein).

At an operation 1204, player accounts may be managed within the instance of the online game executed in operation 1202. In some implementations, operation 1204 may be performed by a player component the same as or similar to player component 114 (shown in FIG. 1 and described herein).

At an operation 1206, sets of virtual tiles may be provided for player interaction in the online game. The sets of virtual tiles provided in operation 1206 may include a first set of virtual tiles. The first set of virtual tiles may correspond to a virtual location in the game space. Individual tiles in the first set of virtual tiles provided in operation 1206 may be associated with groups of non-player entities. The individual tiles included in the first of tiles provided in operation 1206 may be interconnected such that access to a second tile in the first set of virtual tiles may be made available to the player only after the player has defeated the non-player entities associated with the first tile. A prize may be associated with the first set of virtual tiles such that the prize may be awarded to the player after the player has defeated the non-player entity (or entities) associated with last tile in the first set of virtual tiles. In some implementations, operation 1206 may be performed by a virtual tile set component the same as or similar to virtual tile set component 116 (shown in FIG. 1 and described herein).

At an operation 1208, a request to interact with the first set of virtual tiles may be received from a player. In some implementations, operation 1208 may be performed by a virtual tile interaction component the same as or similar virtual tile interaction component 118 (shown in FIG. 1 and described herein).

At an operation 1210, a set of resources may be granted to the player such that the player may interact with the first set of virtual tiles using the resources granted in operation 1210. By way of non-limiting example, the resources that may be granted to the player in operation 1210 may include a quantity of troops of any kind (e.g., foot soldiers, spearman, longbow man, infantry, marine, special force, navy, cavalries, magic creatures, mages, or any other type(s) of troops), a quantity of heroes (e.g., generals, knights, dragon riders, and/or any other types of heroes), a quantity of weapons, a quantity of healing potions, a quantity of ammunitions, a quantity of action points, and/or any other type(s) of resources usable in the game space. In some implementations, operation 1210 may be performed by a virtual tile interaction component the same as or similar virtual tile interaction component 118 (shown in FIG. 1 and described herein).

At an operation 1212, the player may be enabled to allocate a subset of the resources granted in operation 1210 to defeat a given tile in the first of virtual tiles. In some implementations, operation 1212 may be performed by a resource allocation component the same as or similar resource allocation component 120 (shown in FIG. 1 and described herein).

At an operation 1214, an outcome of an engagement of the subset of the resources allocated in operation 1212 and the non-player entity (or entities) associated with the given tile in the first set of virtual tiles may be simulated and an outcome of the simulated engagement may be determined. Simulating the engagement in operation 1214 may involve simulating combat actions between the allocated resources and the one or more non-player entities, determining outcomes of the combat actions, evaluate for an outcome of the encounter based on the determined outcomes of the combat actions, and/or any other operations. The simulated combat actions may include exchanging hits, projectiles, magic spells, and/or any other combat actions between the allocated resources and the one or more non-player entities. An outcome of a simulated engagement between the allocated subset of resources and the one or more non-player entities may be determined based on one or more combat characteristics of the performing allocated subset of the granted resources and/or one or more combat characteristics of the non-player entities. In some implementations, determining outcomes of the engagement by the virtual tile interaction component may be probabilistic such that the outcomes would not be the same if the same combat actions were evaluated again. Determining the outcome of the engagement in operation 1214 may include determining whether the allocated subset of granted resources has defeated the non-player entity (or entities) associated with the given tile. This may involve comparing the combat outcome actions between the allocated subset of resources and the non-player entity (or entities) to one or more predetermined threshold conditions. In some implementations, operation 1214 may be performed by a virtual tile interaction component the same as or similar virtual tile interaction component 118 (shown in FIG. 1 and described herein).

At an operation 1216, a determination whether the player has defeated the last tile in the first set of virtual tiles may be made. As shown, in the case where it is determined that the last tile has not been defeated by the player, the method 120 may proceed back to operation 1212. In the case where it is determined that the last tile has been defeated by the player, the method 1200 may proceed to operation 1218. In some implementations, operation 1216 may be performed by a virtual tile interaction component the same as or similar virtual tile interaction component 118 (shown in FIG. 1 and described herein).

At an operation 128, a prize may be awarded to the player. In some implementations, operation 1218 may be performed by an award component the same as or similar an award component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating player interactions with virtual tiles in an online game, the system comprising
one or more physical processors configured by machine-readable instructions to:
execute an instance of a game space in which the online game takes place, and implement the instance of the game space to facilitate player participation in the online game, wherein the game space is divided into separate tiles, individual ones of the tiles being associated with either players or non-player entities, the tiles including a first tile associated with a first set of one or more non-player entities and a second tile associated with a second set of one or more player entities;
receive virtual tile interaction requests from players and activate the virtual tiles for player interaction responsive to receiving such requests from the players such that responsive to receiving a first request from the first player to interact with the first set of virtual tiles, the first set of virtual tiles are activated for interaction by the first player;
responsive to the individual sets of virtual tiles being activated for interaction by the players, grant sets of resources to the players for interacting with the sets of tiles such that responsive to the first set of virtual tiles being activated for the first player, a first set of resources is granted to the first player for interacting with the first set of tiles, wherein interacting with the first set of tiles by the first player with the first set of resources comprises;

enabling the first player, prior to initiating an engagement with the first set of the one or more non-player entities associated with the first tile, to allocate a first subset of the resources in the first set of resources for the engagement with the first set of the one or more non-player entities associated with the first tile, wherein the first player is limited to using the first subset of the resources allocated for the engagement with the first set of the one or more non-player entities associated with the first tile at least until the engagement ends and an outcome of the engagement is determined;

determining the outcome of the engagement between the first subset of the resources and the first set of the one or more non-player entities; responsive to the determined outcome indicating the first player has defeated the first set of the one or more non-player entities, enabling the first player to allocate, prior to initiating a second engagement with a second set of the one or more non-player entities associated with the second tile, a second subset of the resources in the first set of resources for a second engagement with the second set of the one or more non-player entities associated with the second tile, wherein the first player is limited to using the second subset of the resources allocated for the second engagement with the first set of the one or more non-player entities associated with the first tile at least until the second engagement ends and a second outcome of the second engagement is determined;

determining the second outcome of the second engagement between the second subset of the resources and the second set of the one or more non-player entities.

2. The system of claim 1, wherein the one or more processors are further configured to determine a first prize awarded to the first player based on the outcome of the engagement between the first subset of resources and the first set of non-player entities, and a second prize awarded to the first player based on the second outcome of the second engagement between the second subset of resources and the second set of non-player entities, wherein the value of the first prize is lower than the value of the second prize.

3. The system of claim 1, wherein the one or more processors are further configured to determine a prize awarded to the first player based on the outcome of the engagement between the first subset of resources and the first set of non-player entities, and the second outcome of the second engagement between the second subset of resources and the second set of non-player entities.

4. The system of claim 1, wherein the individual tiles in the first set of tiles are associated with corresponding amounts of stored consideration such that interacting with the individual tiles requires the player to pay the corresponding amounts of stored consideration.

5. The system of claim 4, wherein the stored consideration includes virtual currencies, points, virtual items, and/or real-world money credits.

6. The system of claim 4, wherein the first tile is associated with a first amount of stored consideration and the second tile is associated with a second amount of stored consideration, wherein the first amount of stored consideration is less than the second amount stored consideration.

7. The system of claim 1, wherein the first set of resources include one or more types of troops, one or more weapons, one or more virtual raw resources, and/or one or more virtual items usable in the game space.

8. The system of claim 1, wherein the one or more physical processors configured by machine-readable instructions to responsive to the determined outcome indicating the first player is defeated by the first set of the one or more non-player entities, presenting the first player an offer to re-engage the first set of the one or more non-player entities in exchange for an amount of stored consideration.

9. The system of claim 1, wherein the determination the outcome of the engagement between the first subset of the resources and the first set of the one or more non-player entities, and/or the determination the outcome of the engagement between the second subset of the resources and the second set of the one or more non-player entities is stochastic or quasi-stochastic.

10. A method for facilitating player interactions with virtual tiles in an online game, the method being implemented in one or more physical processors configured to execute computer programs, the method comprising:

executing an instance of a game space in which the online game takes place, and implement the instance of the game space to facilitate player participation in the online game, wherein the game space is divided into separate tiles, individual ones of the tiles being associated with either players or non-player entities, the tiles including a first tile associated with a first set of one or more non-player entities and a second tile associated with a second set of one or more player entities;

receiving virtual tile interaction requests from players and activate the virtual tiles for player interaction responsive to receiving such requests from the players such that responsive to receiving a first request from the first player to interact with the first set of virtual tiles, the first set of virtual tiles are activated for interaction by the first player; responsive to the individual sets of virtual tiles being activated for interaction by the players, granting sets of resources to the players for interacting with the sets of tiles such that responsive to the first set of virtual tiles being activated for the first player, a first set of resources is granted to the first player for interacting with the first set of tiles, wherein interacting with the first set of tiles by the first player with the first set of resources comprises;

enabling the first player, prior to initiating an engagement with the first set of the one or more non-player entities associated with the first tile, to allocate a first subset of the resources in the first set of resources for the engagement with the first set of the one or more non-player entities associated with the first tile, wherein the first player is limited to using the first subset of the resources allocated during the engagement with the first set of the one or more non-player entities associated with the first tile at least until the engagement ends and an outcome of the engagement is determined;

determining the outcome of the engagement between the first subset of the resources and the first set of the one or more non-player entities;

responsive to the determined outcome indicating the first player has defeated the first set of the one or more non-player entities, enabling the first player to allocate, prior to initiating a second engagement with a second set of the one or more non-player entities associated with the second tile, a second subset of the resources in the first set of resources for a second engagement with the second set of the one or more non-player entities associated with the second tile, wherein the first player is limited to using the second subset of the resources allocated for the second engagement with the first set of the one or more non-player entities associated with the first tile at least until the second engagement ends and a second outcome of the second engagement is determined;

determining the second outcome of the second engagement between the second subset of the resources and the second set of the one or more non-player entities.

11. The method of claim 10, further comprising determining a first prize awarded to the first player based on the outcome of the engagement between the first subset of resources and the first set of non-player entities, and a second prize awarded to the first player based on the second outcome of the second engagement between the second subset of resources and the second set of non-player entities, wherein the value of the first prize is lower than the value of the second prize.

12. The method of claim 10, further comprising determining a prize awarded to the first player based on the outcome of the engagement between the first subset of resources and the first set of non-player entities, and the second outcome of the second engagement between the second subset of resources and the second set of non-player entities.

13. The method of claim 10, wherein the individual tiles in the first set of tiles are associated with corresponding amounts of stored consideration such that interacting with the individual tiles requires the player to pay the corresponding amounts of stored consideration.

14. The method of claim 13, wherein the stored consideration includes virtual currencies, points, virtual items, and/or real-world money credits.

15. The method of claim 13, wherein the first tile is associated with a first amount of stored consideration and the second tile is associated with a second amount of stored consideration, wherein the first amount of stored consideration is less than the second amount stored consideration.

16. The method of claim 10, wherein the first set of resources include one or more types of troops, one or more weapons, one or more virtual raw resources, and/or one or more virtual items usable in the game space.

17. The method of claim 10, further comprising responsive to the determined outcome indicating the first player is defeated by the first set of the one or more non-player entities, presenting the first player an offer to re-engage the first set of the one or more non-player entities in exchange for an amount of stored consideration.

18. The method of claim 10, wherein the determination the outcome of the engagement between the first subset of the resources and the first set of the one or more non-player entities, and/or the determination the outcome of the engagement between the second subset of the resources and the second set of the one or more non-player entities is stochastic or quasi-stochastic.

* * * * *